C. LE G. FORTESCUE.
TRANSFORMER.
APPLICATION FILED AUG. 9, 1916.
1,239,896.
Patented Sept. 11, 1917.
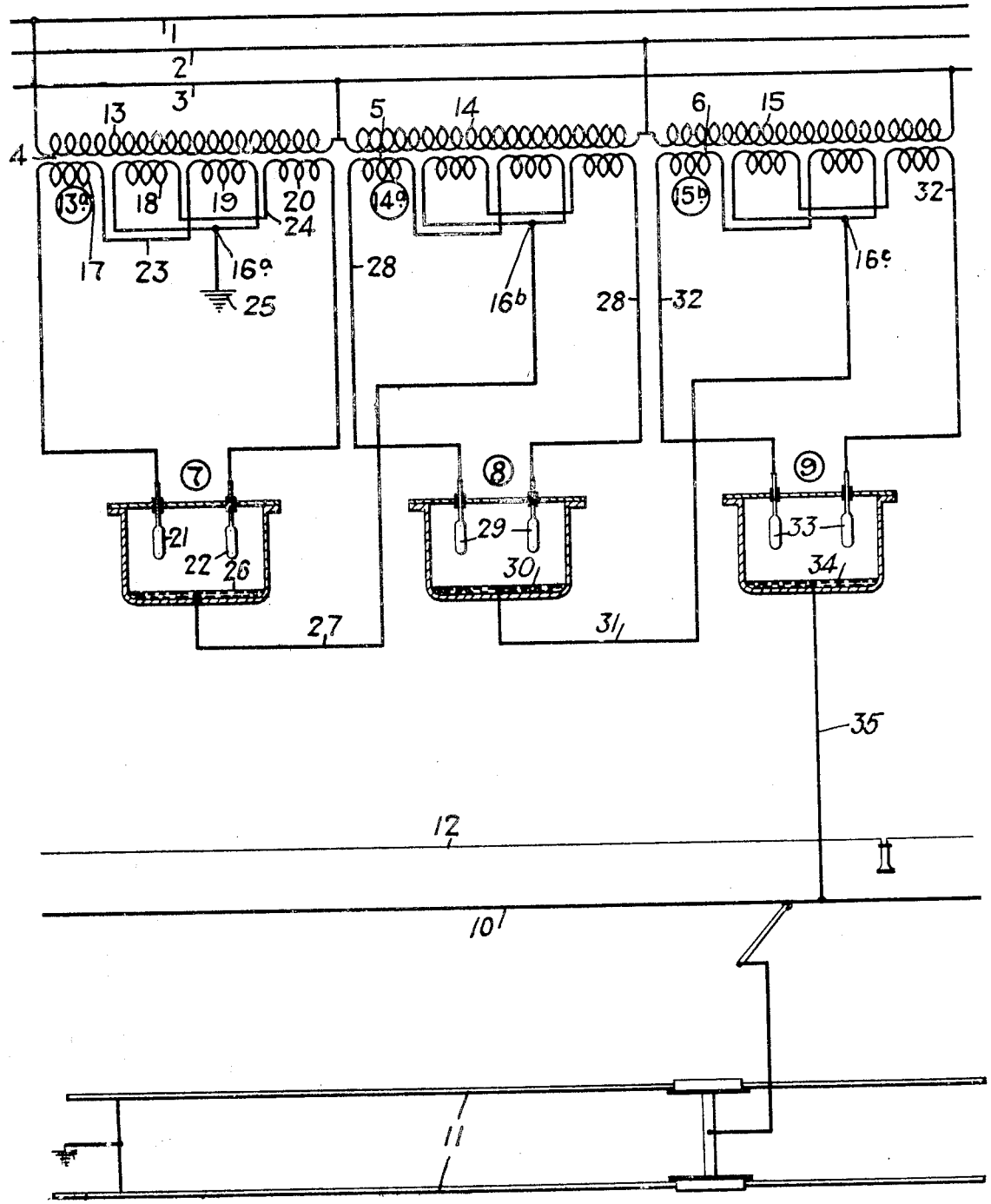
WITNESSES:
INVENTOR
Charles Le G. Fortescue
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

TRANSFORMER.

1,239,896.

Specification of Letters Patent. Patented Sept. 11, 1917.

Application filed August 9, 1916. Serial No. 113,899.

*To all whom it may concern:*

Be it known that I, CHARLES LE G. FORTESCUE, a subject of the King of England, and a resident of Pittsburgh, in the county of Allegheny and State of Pennsylvania, have invented a new and useful Improvement in Transformers, of which the following is a specification.

My invention relates to alternating-current transformers, and it has special relation to such transformers as are employed in connection with vapor-rectifying devices that are electrically connected to one another and to the several phases of a polyphase circuit.

More particularly, my invention relates to transformers the secondary windings of which are directly connected in circuit with double-anode vapor rectifiers and excited from the several phases of a polyphase circuit, the rectifiers being interconnected with one another, through the intermediary of the transformer secondary windings, to supply rectified currents to a common power circuit.

The secondary windings of transformers heretofore employed with double-anode vapor converters were divided into two coils by means of mid-point taps, the coil terminals, in conjunction with the cathodes of the rectifiers, constituting the terminals of the supply sources for the rectified-current circuits. When a rectifier of this type was interconnected between a single-phase alternating-current supply circuit and a rectified-current circuit, a large leakage flux between the two coils of the secondary winding of the associated transformer was intentionally established in order to impart the well known sustaining action to the rectified current. By reason of this leakage flux continuing in one coil of the secondary winding after the arc formed at the particular anode associated therewith was extinguished, an electrical impulse was generated in the rectified-current circuit when an arc was subsequently established at the other anode of the rectifier upon the reversal of the alternating-current wave. This impulse is generated because of the discontinuity of current flow in the immediate active coil of the transformer secondary winding which results from the other coil of the secondary winding tending to maintain, by reason of the leakage flux, the current flow therein that was previously established by the arc formed at its associated anode.

Again, in a transformer of this character both coils of the secondary winding assume different mean electrostatic potentials, the immediately active coil having its mean potential established by the arc of the rectifier and the other coil having its mean potential established by reason of its position in space with respect to the other electrical elements associated therewith. The second coil may be considered, in a way, as being a segregated charged body which arbitrarily assumes a mean potential in space different from that of the active coil. On a reversal of the alternating-current wave, the aforesaid second coil has its mean potential changed to a value dependent upon the potential of the arc and, therefore, a charging current must flow either to, or away from, said second coil in order that its mean potential may vary in accordance with the arc potential during the alternate energizations of the coil. As a result of this flow of charging currents, high-frequency impulses are generated and projected upon the distributing circuit, thereby causing induced disturbances to be impressed upon an adjacent intelligence-transmission circuit.

In a polyphase circuit in which the phases are severally provided with double-anode vapor rectifiers and transformers of the character indicated above, the rectifiers and secondary windings of the transformers being interconnected to furnish rectified current to a common circuit, the electrical impulses generated in succession by the several pulses generated in succession by the several vapor converters and impressed upon the rectified-current circuit will induce disturbances in an adjacent inductively related circuit, such as an intelligence-transmission circuit, that will seriously interfere with the satisfactory operation of the latter.

In order to eliminate these impulses and their consequent disturbances upon an adjacent circuit, I propose the system of the present invention.

For a better understanding of the nature and scope of my invention, reference may be had to the following description and the accompanying drawing the single figure of which is a diagrammatic representation of a distributing system embodying a form of my invention.

Referring to the single figure, a polyphase alternating-current system, comprising three-phase conductors 1, 2 and 3, is connected, through transformers 4, 5 and 6 and three vapor converters 7, 8 and 9, to a direct-current-railway system consisting of a trolley conductor 10 and a track 11. It is intended that the railway circuit be operated at a high direct-current voltage and, to this end, the aforementioned vapor converters are connected in series relationship to furnish rectified currents of the required voltage to the railway system.

An intelligence-transmission conductor 12, shown as a portion of a telephone circuit, is disposed in proximity to the railway system and, therefore, is subject to all inductive disturbances arising therefrom. Since the current traversing the trolley and track of the railway system is a rectified current that may be represented as a uni-directional wave tipped with a plurality of small undulations, the telephone conductor 12 will ordinarily have insufficient electromotive forces induced therein to seriously interfere with its operation. When, however, electrical impulses of any appreciable amplitude, or impulses arising from the discontinuity of the circuit occasioned by the leakage flux, as mentioned above, obtain in the railway system, the induced disturbances in the telephone circuit may seriously impair its operation. To preclude the occurrence of electrical impulses in the railway circuit by reason of the vapor converters and the transformers associated therewith, I divide the secondary windings of the transformers as herein indicated.

Each of the transformers 4, 5 and 6 comprises primary windings 13, 14 and 15 and secondary windings 13$^a$, 14$^a$ and 15$^b$, respectively, the former being connected in delta-formation to the three phases of the alternating-current supply system. Each of the secondary windings comprises a plurality of coils, in this particular instance four coils, in order that active turns of the windings may simultaneously obtain in alternate coils on both sides of mid-point taps 16, 16$^a$, 16$^b$ and 16$^c$ during each half of the impressed alternating-current wave. Since the secondary windings of the transformers are identical, my description will be limited to the secondary winding 13$^a$ of the transformer 4. The secondary winding 13$^a$ comprises four coils 17, 18, 19 and 20, the coils 17 and 20 constituting the end coils the end terminals of which are connected to anodes 21 and 22, respectively, of the vapor converter 7. The coil 17 is connected in series-circuit relationship with the coil 19 by means of a conductor 23, and the coil 18, which is interposed between the coils 17 and 19, is connected in series-circuit relationship with the coil 20 by means of a conductor 24. It will be noted from the foregoing that the coils of the secondary winding 13$^a$ are interlaced, since alternate coils are simultaneously energized during the alternate energizations of the two anodes 21 and 22 of the vapor converter. The mid-point tap 16$^a$ of the secondary winding 13$^a$ is grounded at 25 and the cathode 26 of the vapor converter 7 is connected, by means of a conductor 27, to the mid-point tap 16$^b$ of the secondary winding 14$^a$.

Since the rectifiers 7, 8 and 9 are connected in series relationship, terminals 28 of the secondary winding 14$^a$ are connected to two anodes 29 of the vapor converter 8. The cathode 30 of the vapor converter 8 is then connected, by means of a conductor 31, to the mid-point tap 16$^c$ of the secondary winding 15$^b$. The terminals 32 of the secondary winding 15$^b$ are likewise connected to anodes 33 of the vapor converter 9, the cathode 34 being connected, by means of a conductor 35, to the trolley conductor 10 of the railway system.

The secondary windings of the transformers 4, 5 and 6 are divided into a plurality of coils, such as the secondary winding 13$^a$, and are interlaced with one another in order to eliminate all leakage flux between the alternate active portions or coils. Unless a leakage flux is dispensed with, as has been indicated above, electrical impulses will be generated on the initiation of each arc in the vapor converters, and these impulses will induce disturbances in the telephone conductor 12.

To further explain the conditions eliminated by interlacing the secondary windings, assume that the secondary windings are of the usual form in which provision is made for the creation of a magnetic leakage flux for sustaining purposes. Therefore, when the arc at one anode of a rectifier is extinguished, the other two rectifiers will force current through the third, thereby producing an instant change of arc from one anode to another that, in turn, produces a discontinuity in the immediately active portion of the secondary transformer winding, by reason of the sustaining flux obtaining in the portion of the secondary winding that was active during the preceding instant. This discontinuity of circuit sends an impulse into the system, which impulse is similar to that produced by a condenser discharge. A succession of these impulses will permit the system to freely oscillate at its normal period and the amplitude of the impulses will be proportional to the stored magnetic energy which remains at the discontinuance of the arc in the secondary circuit of the transformer.

By interlacing the secondary winding, as indicated above, the effective self-induction of the two halves of the secondary winding, operating in opposition, will be practically zero. This condition permits the current in a rectifier to change from one anode to the other in an infinitesimal time without requiring an expenditure of energy which otherwise must be supplied from the other two rectifiers that are active at the same instant.

By interlacing the coils comprising the secondary windings, the charging currents, mentioned above, are eliminated since the mean electrostatic potentials of the two pairs of simultaneously active coils are maintained substantially equal by reason of their close and intimate relationship that is established when coils are interlaced with one another. By making the mutual inductance between the several coil sections of the secondary winding substantially perfect and the effective self-inductance of the simultaneously active portions of the secondary winding substantially zero, the aforementioned disturbances or impulses are eliminated and, consequently, no disturbances are induced in the telephone conductor 12 which will interfere with its operation.

By thus forming the secondary winding of the current-rectifier transformers into a plurality of coils, and then interlacing these coils with one another, the leakage fluxes and charging currents are eliminated and no impulses are set up in the rectified-current circuit which will induce disturbances in an adjacent circuit.

While I have shown the transformers as having secondary windings that severally comprise four coils, it will be understood that other combinations may be used to effect the same results, and I desire, therefore, that only such limitations shall be imposed as are indicated in the appended claims.

I claim as my invention:

1. The combination with a double-anode vapor converter, of a transformer therefor having its secondary winding provided with an intermediate tap, said secondary winding comprising a plurality of coil groups on each side thereof, the coils on one side of said intermediate tap being interlaced with coils on the other side thereof to substantially eliminate the leakage flux between the alternate active portions of said winding.

2. The combination with a double-anode converter, of a transformer therefor having its secondary winding comprising a plurality of coil groups on each side of said mid-tap that are interlaced with one another to eliminate magnetic leakage fluxes between the alternately active portions of said secondary winding.

3. The combination with a double-anode vapor converter, of a transformer therefor having its secondary winding provided with an intermediate tap, said secondary winding comprising a plurality of coils on each side of said intermediate tap that are alternately connected in series circuit with one another in order that the mutual inductance between the alternately active portions of said winding may be substantially unity.

4. A distributing system comprising a plurality of vapor converters, transformers having primary and secondary windings for supplying alternating currents thereto, and a rectified-current circuit to which the rectifiers are connected in series relationship through the said secondary windings of said transformers, said secondary windings severally having a mid-point tap and comprising a plurality of coils on each side thereof which are so interconnected that alternate coils are simultaneously energized during each excitation of said vapor converter.

5. A distributing system comprising a plurality of transformers having their primary windings severally excited from separate phases of a polyphase supply circuit and their secondary windings severally connected to double-anode vapor converters that, in turn, are connected in series relationship with each other through said secondary transformer windings to a common circuit, said secondary transformer windings comprising a plurality of coils on each side of their mid-points that are alternately connected in circuit with one another to become simultaneously energized with rectified currents on each reversal of the alternating-current waves impressed on the primary windings.

6. A system of distribution comprising a polyphase alternating-current supply circuit, transformers having their primary windings connected to different phases thereof, current rectifiers having their anodes connected to the terminals of the secondary windings of the transformers, said rectifiers being connected in series relationship through conductors extending between the rectifier cathodes and mid-points on said transformer secondary windings, and a distributing circuit for the rectified current connected to the series-connected rectifiers, said secondary windings of the transformers being severally divided into a plurality of coils on each side of their mid-point taps and said coil sections being alternately connected to one another so that alternate coils thereof may be energized during each cycle of the alternating current wave impressed on the associated primary winding.

In testimony whereof, I have hereunto subscribed my name this 19th day of July, 1916.

CHARLES LE G. FORTESCUE.